Patented Nov. 16, 1926.

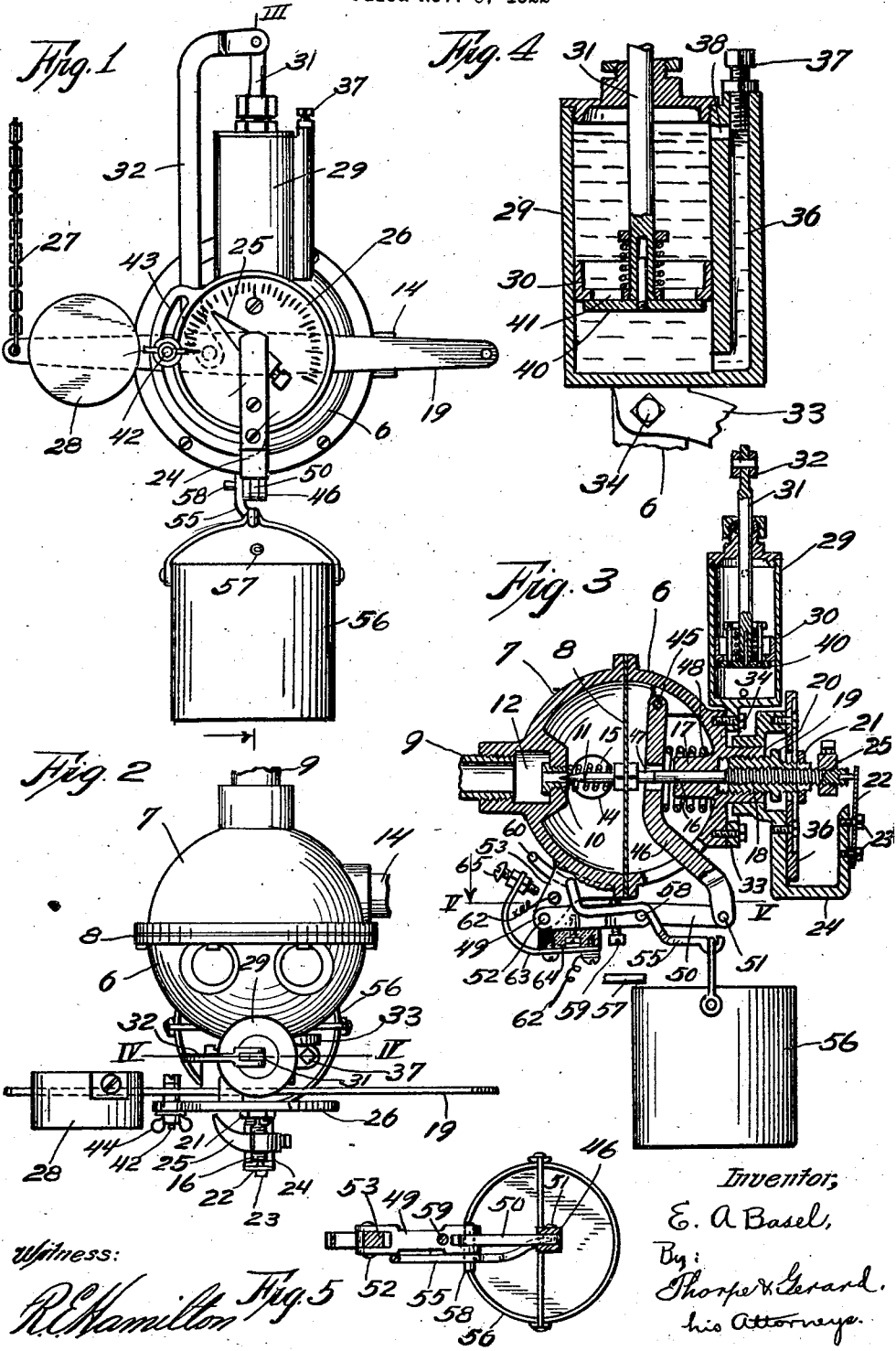

1,607,041

UNITED STATES PATENT OFFICE.

ELI ANDREW BASEL, OF KANSAS CITY, MISSOURI.

CONTROL DEVICE FOR OIL-BURNER VALVES.

Application filed November 6, 1922. Serial No. 599,400.

The present invention relates to valves and valve controlling devices, with particular reference to valves of the type especially designed for use with burners using either liquid or gaseous fuel.

One of the main objects in view is to provide a valve of this character with an automatic and adjustable controlling device operating to prevent a too quick or sudden movement of the valve, and particularly to effect a gradual opening movement of the valve.

Another feature of the improvements consists in the provision of a valve-operating thrust rod with means tending to relieve the rod of any counterthrust exerted from the direction of the valve, with a view to promoting a free operative movement of the rod.

It is further sought to provide an improved automatic cut-off mechanism for the valve, designed to operate in response to an overflowing condition of the burner, and of an extremely sensitive character and including means for effecting a fine adjustment of its operation.

As a further feature of the improvements I provide an alarm or signal device automatically operating in response to each operation of the cut-off mechanism, and thereby calling attention to the overflowing condition of the burner with which the valve is designed to be used.

With the foregoing general objects in view, the invention will now be described by reference to the accompanying drawing illustrating one form of construction which I have devised for embodying the invention, after which those features deemed to be novel will be particularly set forth and claimed.

In the drawing—

Figure 1 is a front elevation illustrating a valve structure embodying the present features of improvement;

Figure 2 is a plan view of the same;

Figure 3 is a vertical sectional view taken on the line III—III of Figure 1;

Figure 4 is an enlarged section, taken on the line IV—IV of Figure 2; and

Figure 5 is a section taken on the line V—V of Figure 3.

Referring now to the drawing in detail, this illustrates the proposed features of improvement in connection with a valve structure similar to that described in my copending application Serial No. 528,062 filed January 9, 1922, this valve structure comprising a substantially spherical form of valve casing split in two sections 6 and 7, embracing between them a diaphragm member 8 of suitable flexible material, such as light sheet metal.

With the casing section 7 is connected a suitable intake pipe 9 for the fuel which is conducted by way of a valve port 10 controlled by a needle valve 11 carried centrally by the diaphragm member 8; from the pipe 9 the fuel is conducted through a chamber 12 past the valve 11 and through the casing section 7 to the outlet pipe 14 leading to the burner (not shown). The valve 11 is so fitted to the diaphragm member 8 as to be maintained by the latter, by cooperation of a spring 15 coiled around the valve 11, normally in open position, as represented in Figure 3; and on the opposite or front face of the diaphragm the stem of said valve is adapted to be engaged by an operating or thrust rod 16, for the suitable regulation of the position of the valve. This rod 16 is mounted in an inwardly projecting bearing portion 17, and the outer portion of the rod is threaded through the hub portion 18 of a lever 19, said hub portion being, in turn, threaded into a socket 20 projecting outwardly from the casing section 6 in line with the axis of the valve. The outer end of the hub portion 18 of the lever is split and slightly tapered (see Figures 2 and 3) for receiving a nut 21 for clamping the hub to the rod 16. The outer end of this rod 16 is engaged by a pressure spring 22 supported by means of a pair of adjusting screws 23 carried by a bracket member 24 secured exteriorly to the bearing portion 20 projecting from the casing section 6. The provision of the pressure finger or spring 22 operates to relieve the thrust rod 16 of the counterthrust due to pressure on the valve side of the diaphragm 8 as hereinafter explained, resulting in a freer operation of the rod 16.

To the outer end of the rod 16 is also secured a finger or pointer 25 designed to operate as an index around a dial member 26 carried by the bracket member 24, for convenience in observing the degree of opening of the valve. One end of the lever 19 has attached thereto a chain 27 leading to any preferred type of thermostat system (not shown) which may be adopted for the automatic control of the valve, in a manner well understood.

The opening of the valve in the arrangement illustrated is designed to be effected by means of a counterweight 28 mounted on that end of the lever 19 to which the chain 27 is attached. Ordinarily, the opening movement of the valve is caused to take place too rapidly, or faster than the oil can be vaporized in the relatively cool condition of the burner, and I therefore provide means for retarding this valve-opening movement in the form of a dash-pot structure comprising a cylinder 29 and plunger 30 carried by a plunger rod 31 connected by a link 32 with that arm of the lever 19 which carries the counterweight 28. The cylinder 29 is attached to the casing section 6 by means of a yoke 33 and attaching screws 34, and as usual in such constructions the cylinder is formed with a bypass passage 36 communicating with opposite ends of the cylinder; at its upper end said passage is fitted with an adjustable screw 37 operating as a valve in conjunction with the port 38 between the passage 36 and upper end of the cylinder, and thus regulating the retarding effort exerted by the device upon the lever 19. As clearly illustrated in Figure 4, the plunger 30 carries a valve member 40 adapted to be maintained closed in the downward movement of the plunger, but opening automatically in the upward movement of the plunger to unclose the plunger openings 41 and thus allowing the plunger to move with comparative freedom on its upward stroke.

For locking the valve in any given position, a bolt 42 is carried by the lever 19, said bolt projecting through a slot 43 formed in the margin of the dial plate 26, and provided with a nut 44 for clamping engagement with the plate, as shown in Figures 1 and 2.

Pivotally connected, as indicated at 45, to the interior of the casing section 7, is a lever 46 formed with an intermediate opening 47 for clearing the abutting ends of the valve 11 and rod 16, this portion of said lever 46 being engaged by a coil spring 48 surrounding the bearing portion 17 and tending to actuate said lever in the direction of the diaphragm 8 for forcing the valve 11 into closed position. The lever 46 is maintained normally in retracted position to permit opening of the valve by a pair of toggle links 49 and 50, the latter being pivoted, as at 51, to the lower end of the lever 46, while the other link 49 is pivoted, as at 52, to a lug 53 depending from the casing section 7 (see Figure 3).

An arm 55 is also pivotally mounted in the lug 53 and formed with a terminal hook for supporting engagement with a bucket 56, for the purpose of receiving oil discharging from a pipe 57 connected with the burner, in case the latter should overflow, as in the event of the burner flame becoming extinguished. When the toggle links are in straightened position, as shown in Figure 3, a pin 58 connecting said links and forming the toggle joint, engages the intermediate portion of the arm 55 and slightly raises the same, supporting it and the bucket 56 carried thereby. The straightening action of the toggle links is adjusted and limited by a stop screw 59 carried by the links 49 and adapted to engage the valve casing; by this means, the sensitiveness of the tripping action and release of the lever 46 in response to the weight of the oil overflowing into the bucket 56 may be conveniently varied. After each tripping action, the movement of the bucket is stopped, with the arm 55 out of engagement with the pin 58, by means of an extension 60 from the pivoted end of said arm, which is adapted to engage the valve casing, thus preventing any slopping of the contents of the bucket due to too great movement or sudden stopping thereof, and retaining the bucket in proper receiving relation to the overflow pipe 57.

A signaling means is also provided for operation in response to each tripping action of the bucket. This means comprises conducting wires 62 designed to be included in any suitable alarm circuit, one of these wires being attached to the lug 53 and the other to a plate 63 attached to an insulating block 64 carried by the toggle link 49. The plate 63 is provided with a contact screw 65 adapted, on the breaking of the toggle joint, to be brought into engagement with the lug 53, thereby closing the circuit in an obvious manner and signaling at once to the party in charge of the installation that the burner requires attention.

The foregoing construction provides an efficient valve and controlling means for embodying the features of the invention. In the usual burner installation employing an automatic or thermostatic control, the valve is operated by a quick movement in both its opening and closing directions; after the burner flame has continued at a low stage for any length of time, the burner is cooled off somewhat, so that its condition is not such as to readily convert the full flow of oil into vapor. As a consequence, the combustion will be imperfect, producing a smoky flame with objectionable soot or carbon deposits, and often the flame is extinguished by the sudden inrush of cool oil. This defective burner operation is entirely overcome by the additional dash-pot control feature as applied to the valve-operating lever in the present construction, whereby said lever is prevented from opening the valve too quickly, since the counterweight 28 cannot move the lever 19 any faster than is permitted by the comparatively slow moving plunger of the cylinder 29. This movement may be varied by adjustment of the regulating screw 37, so that the valve will always be opened at the proper slow and uniform rate best adapted for the burner's operation. In case the burner should overflow for any reason, the valve will be at once closed automatically by the weight of a given amount of oil overflowing into the bucket 56, as determined by the adjustment of the screw 59. The stripping construction is particularly sensitive due to the weight of the bucket and its contents being applied right at the toggle joint 58, where the action is most effective and therefore a very small quantity of oil required for the tripping operation. After the tripping operation, the movement of the arm 55 is limited by the extension 60. so that the bucket is stopped almost in its original position and supported independently of the toggle links, and no danger is incurred of slopping the oil from the bucket due to too great a drop of the bucket. Simultaneously with the breaking of the toggle joint, the alarm circuit is closed by the contact screw 65 engaging the lug 53, thus signaling the condition of the burner and the fact that the fuel has been cut off therefrom.

The freedom and smoothness of the valve's operation is materially promoted by the provision of the counteracting pressure spring 22 which tends to overcome any binding action of the hub 18 in the socket 20 due to the counterthrust from the direction of the valve, such counterthrust resulting from the combined action of the spring 15 and pressure of the oil inside the casing section 7 against the corresponding face of the diaphragm 8. With this counterthrust balanced by the adjustable spring element 22, it is obvious that a smoother and freer action of the valve lever 19 is obtained.

While I have illustrated and described what is now deemed to constitute the preferred form of embodiment of the invention, I desire to reserve the right to make such changes or modifications as may fairly fall within the scope of the appended claims.

What I claim is:

1. Valve mechanism for burners comprising, in combination with the fuel passage leading to the burner, a valve controlling the flow of fuel through said passage and provided with means normally holding said valve in open position, a screw-thrust rod in engagement with said valve and operative by rotative movement to close said valve in opposition to said holding means, and compensating pressure means associated with said thrust rod and acting yieldingly to oppose the action of said holding means.

2. Valve mechanism for burners comprising, in combination with the fuel passage leading to the burner, a diaphragm carrying a valve controlling the flow of fuel through said passage across one face of said diaphragm, said diaphragm maintaining said valve normally in open position, a screw thrust rod operative by rotative movement to move said valve into closed position and compensating pressure means associated with said thrust rod and acting yieldingly to oppose the opening movement of said valve.

3. Valve mechanism for burners comprising, in combination with the fuel passage leading to the burner, a normally-open valve controlling the flow of fuel through said passage, a screw thrust rod operative by rotative movement to move said valve into closed position, and adjustable compensating pressure means associated with said rod and acting yieldingly to oppose any counterthrust thereon due to the opening movement of said valve.

4. Valve mechanism for burners comprising, in combination with the fuel passage leading to the burner, a valve controlling the flow of fuel through said passage, releasable means for holding said valve in closed position, mechanical valve-opening means operative automatically, on release of said holding means, to open said valve, and a dash-pot device for retarding the operation of said valve-opening means.

5. Valve mechanism for burners comprising, in combination with the fuel passage leading the burner, a valve controlling the flow of fuel through said passage, valve-operating means comprising a counterweighted arm adapted to be released for automatically opening said valve, and a dash-pot device connected with said arm and acting to effect a gradual uniform valve-opening movement thereof.

6. Valve mechanism for burners comprising, in combination with the fuel passage leading to the burner, a valve controlling the flow of fuel through said passage, valve-opening means comprising a counterweighted arm adapted to be released for automatically opening said valve, and a dash-pot including a valved plunger connected with said arm and adapted to permit free valve-closing movement thereof while operating to retard the valve-opening movment of said arm.

In witness whereof I hereunto affix my signature.

ELI ANDREW BASEL.